(12) United States Patent
Katzir

(10) Patent No.: US 8,364,666 B1
(45) Date of Patent: Jan. 29, 2013

(54) METHOD AND SYSTEM FOR CONTEXT-AWARE DATA PRIORITIZATION USING A COMMON SCALE AND LOGICAL TRANSACTIONS

(75) Inventor: Ziv Katzir, Netanya (IL)

(73) Assignee: Verint Americas, Inc., Roswell, GA (US)

( * ) Notice: Subject to any disclaimer, the term of this patent is extended or adjusted under 35 U.S.C. 154(b) by 333 days.

(21) Appl. No.: 12/464,694

(22) Filed: May 12, 2009

Related U.S. Application Data

(63) Continuation-in-part of application No. 11/968,428, filed on Jan. 2, 2008.

(60) Provisional application No. 61/052,486, filed on May 12, 2008, provisional application No. 61/052,505, filed on May 12, 2008.

(51) Int. Cl.
*G06F 17/30* (2006.01)

(52) U.S. Cl. ........................ 707/723; 707/728; 707/731

(58) Field of Classification Search .................. 707/705, 707/706, 707, 708, 710, 711, 715, 722, 723, 707/728, 731, 735, 737, 748, 749, 750, 758, 707/770, 918, 919, 920, 943
See application file for complete search history.

(56) References Cited

U.S. PATENT DOCUMENTS

| | | | |
|---|---|---|---|
| 5,855,015 A | 12/1998 | Shoham | |
| 6,366,956 B1 | 4/2002 | Krishnan | |
| 7,013,005 B2 * | 3/2006 | Yacoub et al. | 379/265.13 |
| 7,634,474 B2 | 12/2009 | Vassilvitskii | |
| 7,809,599 B2 * | 10/2010 | Andrew et al. | 705/7.26 |
| 2002/0143759 A1 * | 10/2002 | Yu | 707/5 |
| 2003/0105827 A1 * | 6/2003 | Tan et al. | 709/206 |
| 2004/0083129 A1 | 4/2004 | Herz | |
| 2006/0101017 A1 * | 5/2006 | Eder | 707/7 |
| 2009/0099880 A1 * | 4/2009 | Doyle et al. | 705/7 |
| 2009/0171938 A1 * | 7/2009 | Levin et al. | 707/5 |

* cited by examiner

*Primary Examiner* — Shahid Alam
*Assistant Examiner* — Evan Aspinwall
(74) *Attorney, Agent, or Firm* — Meunier Carlin & Curfman

(57) ABSTRACT

A computer-implemented method for performing a data analysis task having an associated analysis context comprises defining the analysis context associated with the data analysis task, receiving a plurality of data items exchanged over a communication network, wherein the plurality of data items comprise a first data item type and a second data item type that is different from the first data item type, processing the data items with a set of prioritization rules to generate relevance scores that quantify a relevance of the data items to the analysis context, wherein the relevance scores are assigned according to a common scale, and generating a prioritization of the data items based on the relevance scores.

20 Claims, 4 Drawing Sheets

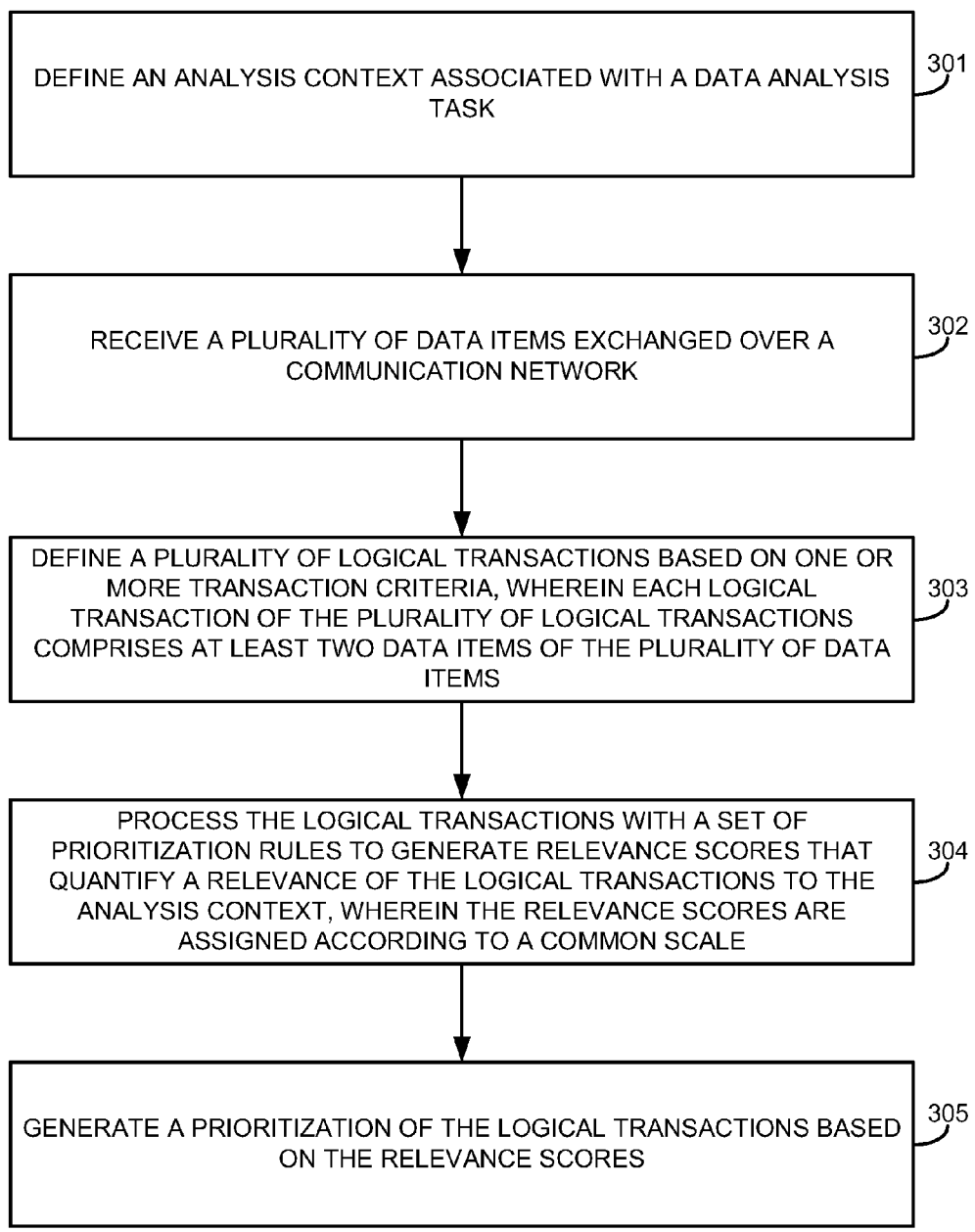

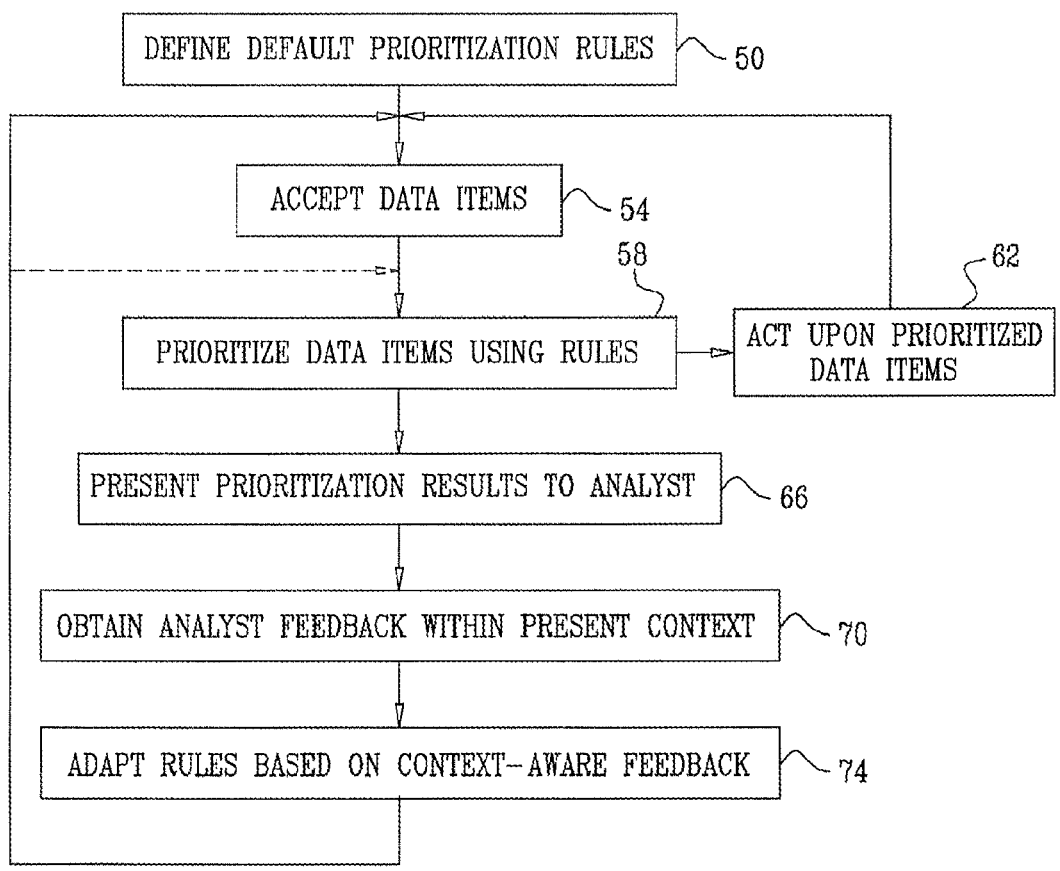

METHOD AND SYSTEM FOR CONTEXT-AWARE DATA PRIORITIZATION USING A COMMON SCALE AND LOGICAL TRANSACTIONS

RELATED APPLICATIONS

This patent application is a continuation-in-part of the U.S. patent application entitled "METHOD AND SYSTEM FOR CONTEXT-AWARE DATA PRIORITIZATION" filed on Jan. 2, 2008 and assigned application Ser. No. 11/968,428 filed on Jan. 2, 2008. This patent application claims the benefit of the U.S. Provisional Application entitled "COMMON RANKING OF SEARCH RESULTS WITHIN A CONTEXTUAL SCORING ENVIRONMENT" filed on May 12, 2008 and assigned U.S. Provisional Application No. 61/052,486, which is hereby incorporated by reference in its entirety. This patent application claims the benefit of the U.S. Provisional Application entitled "RANKING SEARCH RESULTS WITHIN A DATA FUSION ENVIRONMENT" filed on May 12, 2008 and assigned U.S. Provisional Application No. 61/052,505, which is hereby incorporated by reference in its entirety.

TECHNICAL FIELD

The present disclosure relates generally to data analytics, and particularly to methods and systems for prioritizing data items obtained from communication networks.

TECHNICAL BACKGROUND

Various systems and applications monitor and analyze traffic that is exchanged over communication networks. For example, communication interception and analysis systems used by intelligence, law enforcement and government agencies sometimes track target users by analyzing the network traffic they generate. In some cases, analyzing the network traffic involves prioritizing the intercepted data items.

SUMMARY OF THE DISCLOSURE

A computer-implemented method for performing a data analysis task having an associated analysis context comprises defining the analysis context associated with the data analysis task, receiving a plurality of data items exchanged over a communication network, wherein the plurality of data items comprise a first data item type and a second data item type that is different from the first data item type, processing the data items with a set of prioritization rules to generate relevance scores that quantify a relevance of the data items to the analysis context, wherein the relevance scores are assigned according to a common scale, and generating a prioritization of the data items based on the relevance scores.

In some examples, processing the data items with the set of prioritization rules to generate the relevance scores that quantify the relevance of the data items to the analysis context comprises normalizing the data items by assigning a first relevance score to data items of the first data item type and a second relevance score to data items of the second data item type, wherein the first relevance score and the second relevance score comprise different values.

In some examples, the first data item type comprises a web page data item type and the second data item type comprises an electronic mail (e-mail) data item type. In some examples, the plurality of data items comprises a web page, an e-mail message, a file transfer session, an instant messaging chat session, and a textual transcript of a telephone call. In one embodiment, the method includes displaying the prioritization of the data items on a user interface.

There is additionally provided, in accordance with an embodiment of the present invention, a data analysis system for performing a data analysis task having an associated analysis context, the system comprising a processor and a network interface. The processor is configured to define the analysis context associated with the data analysis task. The network interface is configured to receive a plurality of data items exchanged over a communication network, wherein the plurality of data items comprise a first data item type and a second data item type that is different from the first data item type. The processor is configured to process the data items with a set of prioritization rules to generate relevance scores that quantify a relevance of the data items to the analysis context, wherein the relevance scores are assigned according to a common scale, and generate a prioritization of the data items based on the relevance scores.

There is also provided, in accordance with an embodiment of the present invention, a computer-implemented method for performing a data analysis task having an associated analysis context comprising defining the analysis context associated with the data analysis task, receiving a plurality of data items exchanged over a communication network, defining a plurality of logical transactions based on one or more transaction criteria, wherein each logical transaction of the plurality of logical transactions comprise at least two data items of the plurality of data items, processing the logical transactions with a set of prioritization rules to generate relevance scores that quantify a relevance of the logical transactions to the analysis context, wherein the relevance scores are assigned according to a common scale, and generating a prioritization of the logical transactions based on the relevance scores.

In one embodiment, defining the plurality of logical transactions based on the one or more transaction criteria comprises identifying a first idle period based on an idle period threshold during which no packets are sent to or transferred from a packet address, identifying an active period occurring immediately after the first idle period and during the active period a plurality of packets are sent to or transferred from the packet address, and identifying a second idle period based on the idle period threshold occurring immediately after the active period and during the second idle period no packets are sent to or transferred from the packet address, wherein a plurality of data items associated with the plurality of packets comprises a logical transaction.

In some examples, the one or more transaction criteria comprises a username, a time period, a packet address, an e-mail address, and a plurality of web pages linked together through a plurality of hyperlinks. In one embodiment, the method includes displaying the prioritization of the logical transactions on a user interface.

There is additionally provided, in accordance with an embodiment of the present invention, a data analysis system for performing a data analysis task having an associated analysis context, the system comprising a processor and a network interface. The processor is configured to define the analysis context associated with the data analysis task. The network interface is configured to receive a plurality of data items exchanged over a communication network. The processor is configured to define a plurality of logical transactions based on one or more transaction criteria, wherein each logical transaction of the plurality of logical transactions comprise at least two data items of the plurality of data items, process the logical transactions with a set of prioritization rules to generate relevance scores that quantify a relevance of the logical transactions to the analysis context, wherein the relevance scores are assigned according to a common scale, and generate a prioritization of the logical transactions based on the relevance scores.

BRIEF DESCRIPTION OF THE DRAWINGS

FIG. 3 is a flow chart that schematically illustrates a method for context-aware prioritization of logical transactions, in accordance with an embodiment of the present disclosure.

FIG. 4 is a flow chart that schematically illustrates a method for context-aware prioritization of data items, in accordance with an embodiment of the present disclosure.

DETAILED DESCRIPTION

Overview

Figure 1:
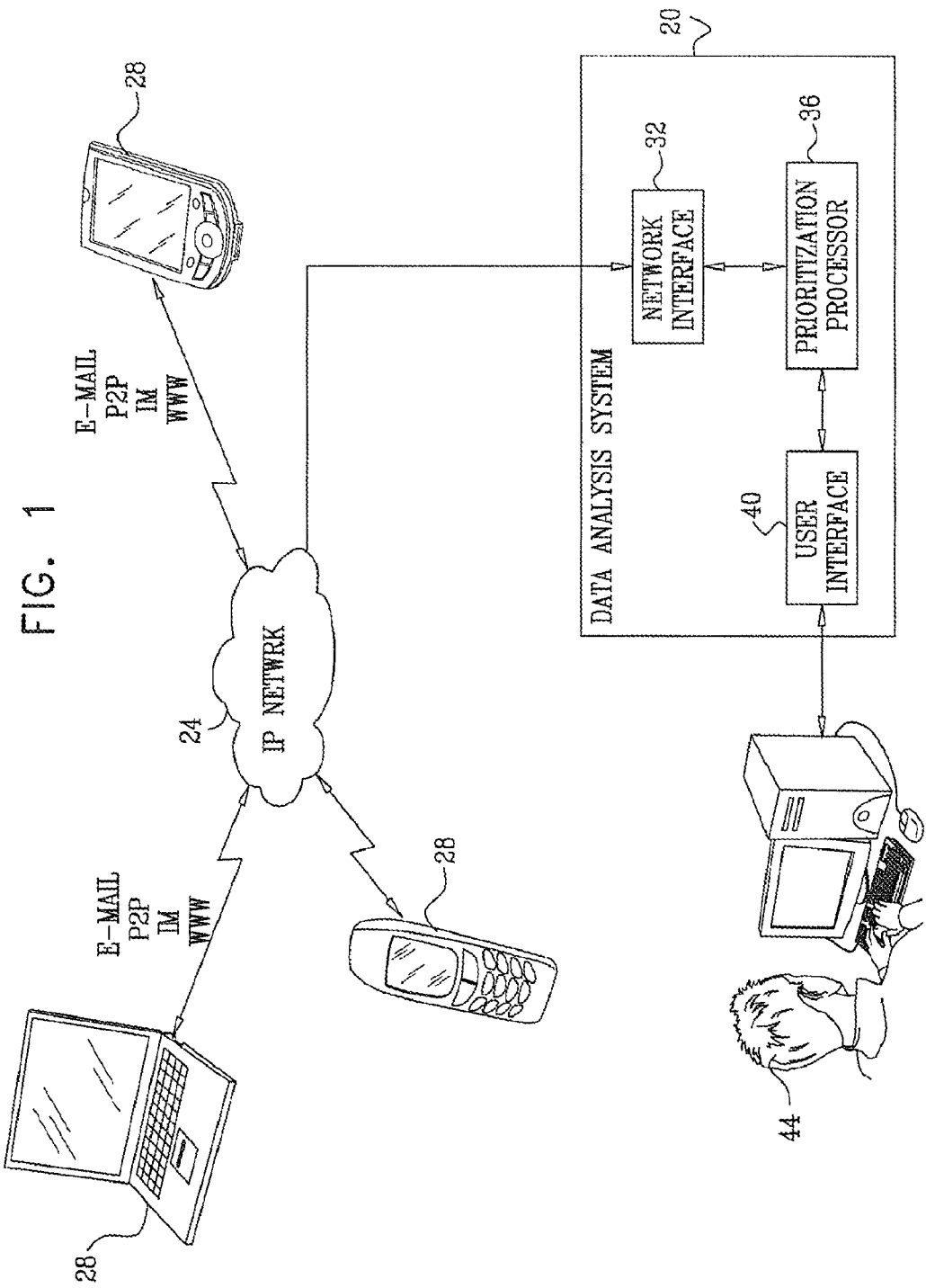
FIG. 1 is a block diagram that schematically illustrates a system for context-aware prioritization of data items, in accordance with an embodiment of the present disclosure.

The volume of traffic exchanged over communication networks, and the variety of communication applications and services used by network subscribers, are growing at an explosive rate. As a result, systems and applications that analyze network traffic are faced with extremely large, often unmanageable amounts of data. In most practical cases, only a small fraction of the intercepted data items have real value or relevance to a particular analysis task. However, these valuable data items are often obscured by a vast number of other data items that are of little value, and often useless. It is nearly impossible for a human analyst to "find the needle in the hay stack," i.e., to differentiate between valuable and low-value data items.

In view of the difficulties associated with manual sorting of large numbers of data items, embodiments of the present disclosure provide methods and systems for automated data item prioritization. Unlike some known prioritization methods, the methods described herein make use of the fact that the relevance of a certain data item usually differs from one analysis context to another. In the present patent application and in the claims, the term "context" refers to the specific objectives and/or preferences that are associated with a particular analysis task.

The context defines the interests and/or preferences of the analyst that should come into effect when prioritizing the data items. A context may comprise, for example, tracking a particular user or group of users, tracking traffic that is relevant to a certain event (e.g., terrorist attack), tracking traffic that is relevant to a certain investigation case or evaluating a certain intelligence assumption. In some cases, the context may also consider the working habits or preferences of the analyst. In many cases, a certain data item may be invaluable in one context, and totally useless in another.

In the embodiments that are described herein, a data analysis system accepts data items, such as items intercepted from a communication network, for prioritization. The data items prioritized by the system typically comprise self-contained communication products, which may contain multiple components and may be constructed using multiple lower-level transactions. Exemplary data items comprise web pages, electronic mail messages (e-mail), chat conversations and/or file transfer sessions, and each such data item is considered a different data item type. For example, a web page is of a different data item type than an e-mail message. The notion of self-contained data items is described and demonstrated in greater detail further below.

In addition, the data items may be grouped together based on various criteria to form logical transactions. For example, a logical transaction could comprise a number of web pages, electronic mail messages, chat conversations, and file transfer sessions that were all accessed or conducted by a user during a certain time period. Such logical transactions can then be ranked based on relevance to context in the same manner as the self-contained data items as described and demonstrated in greater detail below.

The system prioritizes the data items and/or the logical transactions using a set of prioritization rules, which act on the data items or logical transactions and produce relevance scores that quantify the relevance of the data items and/or logical transactions in the applicable analysis context. The rules may consider the content and/or metadata of the data items or logical transactions. The relevance scores provide a common scale to enable a comparison of data items of different types, or a comparison of logical transactions, or even a comparison of data items with different logical transactions.

In some embodiments, the set of rules that define a particular context is adapted and refined in an iterative process, based on feedback obtained from the analyst. In each iteration, the system prioritizes the data items and logical transactions using the current set of rules. The prioritization results are presented to the analyst, who has the option to provide positive and/or negative feedback as to the prioritization quality. The system then adapts the rules based on the analyst's feedback. The existing data items and logical transactions and/or newly-arriving data items and logical transactions are then prioritized using the updated set of rules. The iterative process continues, and the rules are repeatedly refined based on the analyst's feedback.

In general, the analyst does not define the analysis context explicitly, and does not explicitly formulate the rules, but the analyst may do so in some embodiments. Typically, the analyst's role is to provide feedback on the results of the automatic prioritization process, and the rules are adapted automatically based on this feedback. As the analyst-guided iterative process continues, the rules gradually converge to a set of rules that accurately define the desired context.

In other embodiments, the system may carry out or invoke various types of actions based on the prioritization of the data items and logical transactions. For example, the system may present some or all of the data items and logical transactions to the analyst in decreasing order of relevance. The system may filter out some of the data items and logical transactions based on their relevance. The system may trigger an alert, or decide whether to store or discard data items and logical transactions based on the prioritization results. In some embodiments, the set of rules can be used for profiling of other collections of data items and logical transactions, which may originate from the communication network or from any other source. Additionally or alternatively, the prioritization results can be used as input to any other suitable analysis task, system, or application.

The context-aware prioritization methods described herein can be used in a real-time manner to process data items and logical transactions as they are accepted from the communication network, or in an off-line manner to process previously recorded collections of data items and logical transactions.

System Description

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 is a block diagram that schematically illustrates a data analysis system 20 for context-aware prioritization of data items and logical transactions that are exchanged over an Internet Protocol (IP) network 24, in accordance with an embodiment of the present disclosure. System 20 may be operated, for example, by an intelligence, government or law-enforcement agency. In alternative embodiments, system 20 can be used for various network analytics, network optimization and data mining applications.

Network 24 may comprise a Wide Area Network (WAN) such as the Internet, a Metropolitan Area Network (MAN), a Local Area Network (LAN), a wireless terrestrial or satellite IP-based network, and/or any other suitable communication network. Network 24 provides connectivity and communication services to user terminals 28. Terminals 28 may comprise, for example, desktop or mobile computers, Personal Digital Assistants (PDAs), mobile communication terminals such as cellular phones, and/or any other suitable type of communication or computing terminal capable of IP data communication.

User terminals 28 may communicate over network 24 using different communication applications, such as Internet browsing, electronic mail (e-mail), chat and instant messaging, Peer-to-Peer (P2P) and file-sharing applications, file transfer protocols, IP-based voice and/or video telephony, on-line gaming applications, collaboration services, on-line communities and forums, and/or any other suitable application. Typically, each application uses a certain communication protocol for exchanging data.

A certain user communicates over the network by exchanging data items that adhere to the communication protocol or application being used. Exemplary data items may comprise web pages, e-mail messages, chat conversations and File Transfer Protocol (FTP) sessions. In the context of the present patent application and in the claims, the term "data item" is used to describe self-contained communication products, which may contain multiple components and may be constructed by multiple lower-level transactions. For example, a web page presented by a browser may contain different text fields, images, and other components. A single web page may be constructed by the browser in a number of Hyper Text Transfer Protocol (HTTP) transactions. Regardless of the number of individual components or of the number of transactions used to construct a given web page, the page as a whole is regarded as a single data item. As another example, a chat conversation, which may comprise several messages, transferred files and other services, is viewed as a single data item. As yet another example, a single instant messaging message often involves a number of Transmission Control Protocol (TCP) transactions, but is nevertheless considered a single data item.

In addition, the data items may be grouped together based on one or more transaction criteria to form logical transactions. For example, a logical transaction could comprise a number of web pages, electronic mail messages, chat conversations, and file transfer sessions that were all accessed by a single user terminal 28 during a certain time period. To determine which data items comprise a logical transaction, criteria is utilized such as a particular username, a user terminal 28, a time period, an IP address, an e-mail address, related metadata, a series of websites linked through hyperlinks, log-on/log-off or connect/disconnect timestamps, a web session, or any other criteria that could be used to group a series of related data items together to form a logical transaction. In one example, a logical transaction comprises all data items sent or received by a user during a single web session at an Internet café, public library, or other public Internet access connection.

System 20 accepts data items from IP network 20 and processes the data items, in order to provide information regarding users of interest, transactions of interest, determine logical transactions, and/or any other useful information based on the data items. System 20 comprises a network interface 32, which accepts data items from network 24. Depending on the type and configuration of the network, interface 32 may comprise a wireline interface coupled to the network, a wireless receiver coupled to a suitable antenna, or any other suitable means of receiving data items exchanged over the network. Further alternatively, network elements such as switches and routers can be configured to divert or send copies of data items to interface 32. Such methods are commonly referred to as port spanning or port mirroring and are well known in the art.

System 20 further comprises a prioritization processor 36, which prioritizes the data items using methods that are described in detail hereinafter, and a user interface 40, which analyst 44 utilizes to interact with system 20. Typically, processor 36 comprises a general-purpose computer, which is programmed using software to carry out the functions described herein. The software comprises computer-readable processing instructions that are executable on processor 36. The software is stored in a memory device comprising a disk drive, flash drive, data storage circuitry, or some other memory apparatus. When executed by processor 36, the software directs processor 36 to operate data analysis system 20 as described herein.

Ranking Different Data Item Types Using a
Common Scale Based on Relevance to Context In many practical cases, the number of data items that are processed by system 20 is extremely large. Typically, only a small percentage of the data items have real value in a certain context, but these items are often obscured by "noise," i.e., by a large number of lower-value or irrelevant data items. In many scenarios, it is all but impossible for the analyst to manually differentiate between higher-value and lower-value data items, so as to efficiently grasp and make use of the multitude of data items provided by the system.

In view of the difficulties associated with manual sorting of large numbers of data items, embodiments of the present disclosure provide methods and systems for automated data item prioritization. The prioritization methods described herein are context-aware, i.e., they make use of the fact that the relevance of a certain data item usually differs from one analysis context to another.

As noted above, the term "context" is used to describe a particular data analysis task having certain objectives and/or preferences. A context can sometimes be defined as a combination of (1) the preferences of the analyst, i.e., how the analyst prioritizes his or her scope of work, (2) the nature of the traffic that is being prioritized, e.g., network usage patterns, traffic volume, content type and other factors, and (3)

the nature of the analysis task conducted by the analyst, and its effect on the meaning of data items. For example, certain keywords that appear in data items and/or certain network traffic patterns may have different meanings in different analysis tasks or areas of interest.

The context may also consider the working habits or preferences of the analyst. For example, an analyst who does not understand any language other than English may wish to assign non-English data items low priorities. A multi-lingual analyst may not have such a preference. As can be appreciated, a certain data item may be invaluable in one context and completely useless in another.

Figure 2:
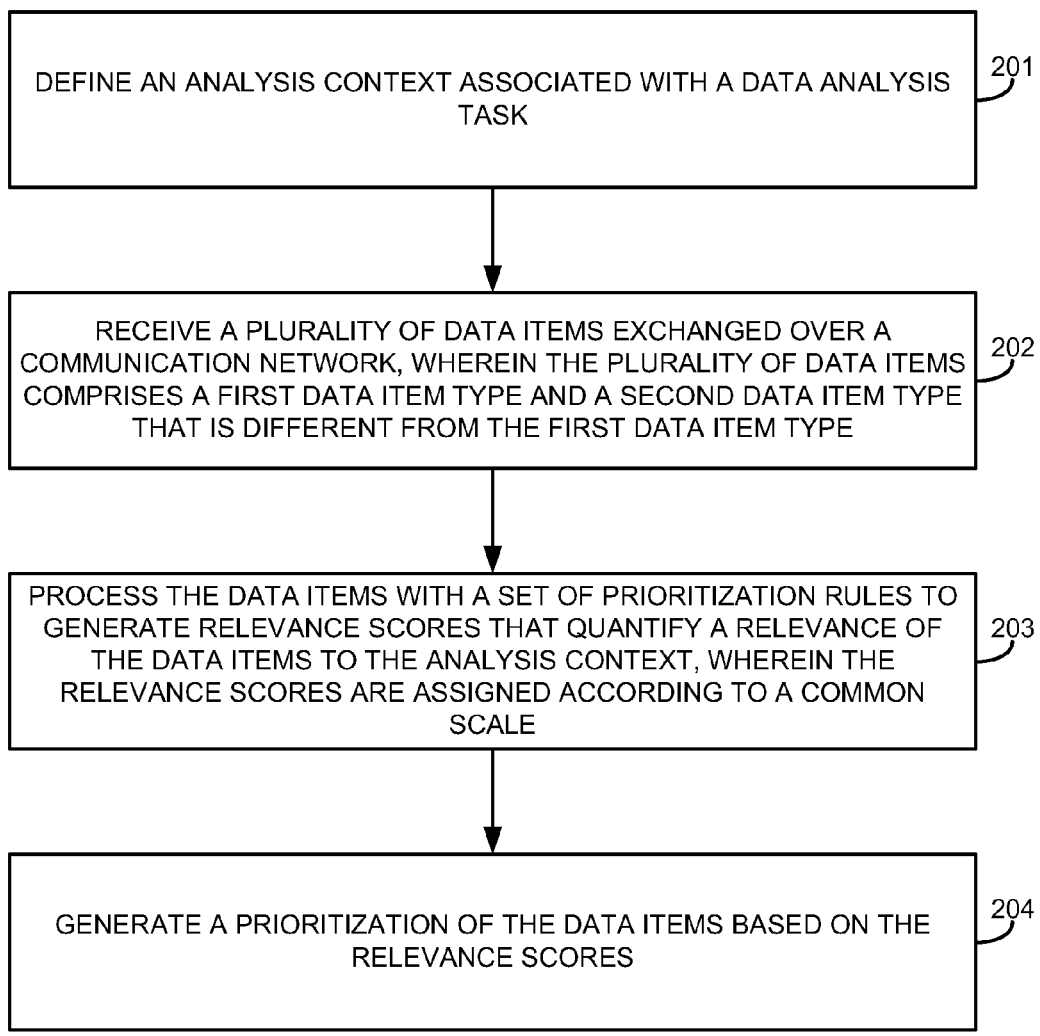
FIG. 2 is a flow chart that schematically illustrates a method for context-aware prioritization of data items of different types, in accordance with an embodiment of the present disclosure.

FIG. 2 is a flow chart that schematically illustrates a method for context-aware prioritization of data items of different types, in accordance with an embodiment of the present disclosure. The method describes a data analysis session conducted by an analyst 44 using system 20. During the session, processor 36 prioritizes data items by applying a set of one or more context-aware prioritization rules. The prioritization rules operate on the data items and produce relevance scores, which define the relative priorities among the data items. Note that in one embodiment the context is not defined explicitly by the analyst 44, and the rules are not formulated explicitly. However, in other examples, the analyst 44 may provide the analysis context by defining some or all of the context-aware rules.

The rules may consider the content of the data items, such as the presence, absence, or occurrence frequency of certain keywords or phrases, the language used in the data items (which may be detected automatically or known in advance), word counts, detected accent or rate of speech (when the data item comprises audio), hyperlinks and the content associated therewith, and/or any other suitable property of the content of the data item.

In addition to content, a data item often contains metadata fields or attributes. Additionally or alternatively to considering the data content, the rules may consider different metadata attributes, such as the protocol type, the amount of data being transferred, the time and date in which the data was generated, the number, size and/or type of files that are included in the data item, identifiers of the user (e.g., username, nickname, or communication address), identifiers of the links or networks used for transferring the data item, and/or any other relevant metadata information of the data item.

The method of FIG. 2 begins with processor 36 defining an analysis context associated with a data analysis task (step 201). In one example, processor 36 uses a set of default predetermined prioritization rules to define the analysis context. Initially, when the context is not yet defined, the default rules may use different heuristics, such as heuristics referring to the relative priorities or weights assigned to different data item types. For example, e-mail and instant messaging data items may be assigned higher scores than web pages. In other examples, the analyst 44 may alter the default rules or define additional rules or heuristics to further define the analysis context.

Prioritization rules that could be used by processor 36 include, for example, assigning a higher score to a data item which is closer in time to the analysis context or a certain event, assigning a higher score to digitally signed data items or data items found in a "trusted zone" or from a particular server, domain, or IP, assigning data items attached to e-mails a higher score than data items found in a web browser cache, assigning a higher score to e-mail communications based on a higher frequency of e-mail exchange between two or more e-mail addresses, assigning higher scores to data items containing embedded figures, phone numbers, credit card numbers, social security numbers, or other identity information, assigning a lower score to data items associated with a domain known for spreading advertisements or "spam" e-mail, assigning a higher score if historical traffic from a particular server or domain exhibited similar patterns with regard to the traffic currently under consideration, or assigning different scores to data items of similar type, such as giving a portable document format (PDF) data item a higher score than a word processor document.

Processor 36 receives a plurality of data items exchanged over a communication network via network interface 32 (step 202). Exemplary data items comprise web pages, electronic mail messages (e-mail), chat conversations and/or file transfer sessions, and each such data item is considered a different data item type. The plurality of data items comprises a first data item type and a second data item type that is different from the first data item type. For example, a first data item type could comprise a web page, and a second data item type could comprise an e-mail message.

In some embodiments, the data items provided for prioritization are filtered by a certain filter or according to certain criteria. For example, the data items may be associated with a certain user or user terminal, e-mail messages sent to a certain e-mail address, transactions performed with a certain web site, data items destined to or originating from a certain country or territory, and/or any other criterion.

Processor 36 processes the data items with a set of prioritization rules to generate relevance scores that quantify a relevance of the data items to the analysis context, wherein the relevance scores are assigned according to a common scale (step 203). Each data item is thus assigned a relevance score, which indicates its relevance or value in the present analysis context. Note that the relevance scores enable comparing of different types of data items. For example, an e-mail message may be considered more relevant than a web page in a particular analysis context, and thus processor 36 would assign the e-mail message a higher relevance score than the web page, effectively weighting the e-mail message higher than the web page. Continuing this example, even if a web site had a greater occurrence of a particular keyword under consideration by the prioritization rules than the occurrence of the same keyword in an e-mail, the e-mail may still be assigned a higher relevance score than the web page given that the e-mail message data item type is considered more relevant than the web page data item type in this example. In this manner, by assigning relevance scores to data items and the data item types according to a common scale, the data item types are normalized to allow comparison and prioritization of the individual data items according to the common scale.

Processor 36 then generates a prioritization of the data items based on the relevance scores (step 204). To generate the prioritization of the data items based on the relevance scores, processor 36 orders the data items in order of highest relevance score to lowest relevance score. These ranked data items may then be displayed on user interface 40, allowing the analyst 44 to quickly identify the most relevant data items according to the analysis context and the prioritization rules.

In other embodiments, system 20 may perform or invoke an action based on the prioritized data items. The system may carry out different types of actions. Several exemplary actions are described further below in the description of FIG. 4.

In another embodiment, after prioritizing the data items, the processor may accept feedback from the analyst regarding the prioritization. The analyst may provide either positive or negative feedback, e.g., indicate that the score assigned to a certain data item is too high, too low, or correct. Obtaining feedback from the analyst and adapting the rules responsively to the feedback are described further below in the description of FIG. 4.

Ranking Logical Transactions

In many practical cases, the number of data items that are processed by system 20 is extremely large. Typically, only a small percentage of the data items have real value in a certain context, but these items are often obscured by "noise," i.e., by a large number of lower-value or irrelevant data items. In many scenarios, it is all but impossible for the analyst to manually differentiate between higher-value and lower-value data items, so as to efficiently grasp and make use of the multitude of data items provided by the system.

In view of the difficulties associated with manual sorting of large numbers of data items, embodiments of the present disclosure provide methods and systems for automated data item prioritization. The prioritization methods described herein are context-aware, i.e., they make use of the fact that the relevance of a certain data item usually differs from one analysis context to another. In the embodiment of FIG. 3, data items may be grouped together based on various criteria to form logical transactions. For example, a logical transaction could comprise a number of web pages, electronic mail messages, chat conversations, and file transfer sessions that were all accessed or conducted by a user during a certain time period. Such logical transactions can then be ranked based on relevance to context in the same manner as the self-contained data items as described with regard to FIGS. 2 and 4.

As noted above, the term "context" is used to describe a particular data analysis task having certain objectives and/or preferences. A context can sometimes be defined as a combination of (1) the preferences of the analyst, i.e., how the analyst prioritizes his or her scope of work, (2) the nature of the traffic that is being prioritized, e.g., network usage patterns, traffic volume, content type and other factors, and (3) the nature of the analysis task conducted by the analyst, and its effect on the meaning of data items. For example, certain keywords that appear in data items and/or certain network traffic patterns may have different meanings in different analysis tasks or areas of interest.

The context may also consider the working habits or preferences of the analyst. For example, an analyst who does not understand any language other than English may wish to assign non-English data items low priorities. A multi-lingual analyst may not have such a preference. As can be appreciated, a certain data item may be invaluable in one context and completely useless in another.

FIG. 3 is a flow chart that schematically illustrates a method for context-aware prioritization of logical transactions, in accordance with an embodiment of the present disclosure. The method describes a data analysis session conducted by an analyst 44 using system 20. During the session, processor 36 prioritizes logical transactions by applying a set of one or more context-aware prioritization rules. The prioritization rules operate on the logical transactions and the data items therein to produce relevance scores, which define the relative priorities among the logical transactions. Note that in one embodiment the context is not defined explicitly by the analyst 44, and the rules are not formulated explicitly. However, in other examples, the analyst 44 may provide the analysis context by defining some or all of the context-aware rules.

The rules may consider the content of the logical transactions and the data items therein, such as the presence, absence, or occurrence frequency of certain keywords or phrases, the language used in the data items (which may be detected automatically or known in advance), word counts, detected accent or rate of speech (when the data item comprises audio), hyperlinks and the content associated therewith, and/or any other suitable property of the content of the logical transactions and the data items therein.

In addition to content, a data item often contains metadata fields or attributes. Additionally or alternatively to considering the data content, the rules may consider different metadata attributes, such as the protocol type, the amount of data being transferred, the time and date in which the data was generated, the number, size and/or type of files that are included in the data item, identifiers of the user (e.g., username, nickname, or communication address), identifiers of the links or networks used for transferring the data item, and/or any other relevant metadata information of the data items comprising the logical transaction.

The method of FIG. 3 begins with processor 36 defining an analysis context associated with a data analysis task (step 301). In one example, processor 36 uses a set of default predetermined prioritization rules to define the analysis context. Initially, when the context is not yet defined, the default rules may use different heuristics, such as heuristics referring to the relative priorities or weights assigned to different logical transactions and the data items therein. For example, e-mail and instant messaging data items may be assigned higher scores than web pages. In other examples, the analyst 44 may alter the default rules or define additional rules or heuristics to further define the analysis context.

Processor 36 receives a plurality of data items exchanged over a communication network via network interface 32 (step 302). Exemplary data items comprise web pages, electronic mail messages (e-mail), chat conversations and/or file transfer sessions, and each such data item is considered a different data item type. Thus, the plurality of data items could comprise a first data item type and a second data item type that is different from the first data item type. For example, a first data item type could comprise a web page, and a second data item type could comprise an e-mail message.

In some embodiments, the data items provided for prioritization are filtered by a certain filter or according to certain criteria. For example, the data items may be associated with a certain user or user terminal, e-mail messages sent to a certain e-mail address, transactions performed with a certain web site, data items destined to or originating from a certain country or territory, and/or any other criterion.

Processor 36 defines a plurality of logical transactions based on one or more transaction criteria, wherein each logical transaction of the plurality of logical transactions comprises at least two data items of the plurality of data items (step 303). For example, a logical transaction could comprise a number of web pages, electronic mail messages, chat conversations, and file transfer sessions that were all accessed by a single user terminal 28 during a certain time period. To determine which data items comprise a logical transaction, transaction criteria is utilized such as a particular username, a user terminal 28, a time period, an IP address, an e-mail address, related metadata, a series of websites linked through hyperlinks, log-on/log-off or connect/disconnect timestamps, a web session, or any other criteria that could be used to group a series of related data items together to form a logical transaction.

In one example, a logical transaction could be defined based on an IP address, where a first idle period during which no packets are sent to or transferred from the IP address is first identified, followed by an active period during which packets are sent to or transferred from the IP address, followed by a second idle period during which no packets are sent to or transferred from the IP address. The first and second idle periods may be determined based on threshold values. For example, an idle period may be defined as a time period during which no packets are transmitted to or from a particular packet address, wherein the time period exceeds a threshold time period; longer than five minutes, for example. In another example, a logical transaction could comprise a single web session, such as all data items sent or received by a user or a particular packet address during a single web session at an Internet café, public library, or other public Internet access connection. In yet another example, a logical transaction could be defined as a series of web pages accessed via a series of hyperlinks, wherein the series of hyperlinks link the series of web pages together.

Processor 36 processes the logical transactions with a set of prioritization rules to generate relevance scores that quantify a relevance of the logical transactions to the analysis context, wherein the relevance scores are assigned according to a common scale (step 304). Each logical transaction is thus assigned a relevance score, which indicates its relevance or value in the present analysis context. Note that the relevance scores enable comparing of different types of data items contained within the logical transactions. For example, an e-mail message may be considered more relevant than a web page in a particular analysis context, and thus processor 36 would assign the e-mail message a higher relevance score than the web page, effectively weighting the e-mail message higher than the web page. In this manner, by assigning relevance scores to the logical transactions and the data item types of the various data items comprising the logical transactions according to a common scale, the logical transactions are normalized to allow comparison and prioritization of the logical transactions according to the common scale. In addition, processor 36 may assign relevance scores to both the individual data items and the logical transactions, thereby enabling a prioritization of both the logical transactions and the data items according to a common scale.

One example of how processor 36 could process the logical transactions with a set of prioritization rules to generate relevance scores will now be discussed. In this example, assume a web page "A" contains two instances of a keyword under consideration by the prioritization rules. A second web page, "B", contains zero instances of the same keyword, but contains links to five other web pages, and each of those five web pages contain a single instance of the keyword. If the web pages were assigned relevance scores in isolation, web page "A" would be ranked the highest with a score of 2, representing the two instance of the keyword found in page "A", and the five linked pages would all be tied as the second highest ranking with a score of 1, representing the single instance of the keyword found in each of the five linked pages. However, now assume that a particular IP address was used to access web page "B" and visit all five of the linked web pages. If web page "B" and the five linked pages are now considered in totality as a logical transaction, this logical transaction would be ranked the highest with a relevance score of 5, representing the five instances of the keyword found in each of the five linked pages comprising the logical transaction. Web page "A", containing only two instances of the keyword, would thus be ranked second with a relevance score of 2.

Referring again to the method of FIG. 3, Processor 36 then generates a prioritization of the logical transactions based on the relevance scores (step 305). To generate the prioritization of the logical transactions based on the relevance scores, processor 36 orders the logical transactions in order of highest relevance score to lowest relevance score. These ranked logical transactions may then be displayed on user interface 40, allowing the analyst 44 to quickly identify the most relevant logical transactions according to the analysis context and the prioritization rules.

In other embodiments, system 20 may perform or invoke an action based on the prioritized logical transactions. The system may carry out different types of actions. Several exemplary actions are described further below in the description of FIG. 4.

In another embodiment, after prioritizing the logical transactions, the processor may accept feedback from the analyst regarding the prioritization. The analyst may provide either positive or negative feedback, e.g., indicate that the score assigned to a certain logical transaction is too high, too low, or correct. Obtaining feedback from the analyst and adapting the rules responsively to the feedback are described further below in the description of FIG. 4.

Context-Aware Prioritization with Feedback Adaptation

In many practical cases, the number of data items that are processed by system 20 is extremely large. Typically, only a small percentage of the data items have real value in a certain context, but these items are often obscured by "noise," i.e., by a large number of lower-value or useless data items. In many scenarios, it is all but impossible for the analyst to manually differentiate between higher-value and lower-value data items, so as to efficiently grasp and make use of the multitude of data items provided by the system.

In view of the difficulties associated with manual sorting of large numbers of data items, embodiments of the present disclosure provide methods and systems for automated data item prioritization. The prioritization methods described herein are context-aware, i.e., they make use of the fact that the relevance of a certain data item usually differs from one analysis context to another.

As noted above, the term "context" is used to describe a particular data analysis task having certain objectives and/or preferences. A context can sometimes be defined as a combination of (1) the preferences of the analyst, i.e., how the analyst prioritizes his or her scope of work, (2) the nature of the traffic that is being prioritized, e.g., network usage patterns, traffic volume, content type and other factors, and (3) the nature of the analysis task conducted by the analyst, and its effect on the meaning of data items. For example, certain keywords that appear in data items and/or certain network traffic patterns may have different meanings in different analysis tasks or areas of interest.

The context may also consider the working habits or preferences of the analyst. For example, an analyst who does not understand any language other than English may wish to assign non-English data items low priorities. A multi-lingual analyst may not have such a preference. As can be appreciated, a certain data item may be invaluable in one context and completely useless in another.

FIG. 4 is a flow chart that schematically illustrates a method for context-aware prioritization of data items, in accordance with an embodiment of the present disclosure. The method describes a data analysis session conducted by an analyst using system 20. During the session, processor 36 prioritizes data items by applying a set of one or more context-aware rules. The rules operate on the data items and produce relevance scores, which define the relative priorities among the data items. The prioritization rules are adapted iteratively based on feedback provided by the analyst, and therefore gradually converge to a set of rules that characterize the desired context. Note that the context is not defined explicitly by the analyst, and the rules are not formulated explicitly. The analyst provides feedback on the results of the automatic prioritization process, and the feedback is used for adapting the automatically-generated rules.

The rules may consider the content of the data items, such as the presence, absence or occurrence frequency of certain keywords or phrases, the language used in the data items (which may be detected automatically or known in advance), word counts, detected accent or speed (when the data item comprises audio), and/or any other suitable property of the content of the data item.

In addition to content, a data item often contains metadata fields or attributes. Additionally or alternatively to considering the data content, the rules may consider different metadata attributes, such as the protocol type, the amount of data being transferred, the time and date in which the data was generated, the number, size and/or type of files that are included in the data item, identifiers of the user (e.g., username, nickname or communication address), identifiers of the links or networks used for transferring the data item, and/or any other relevant metadata information of the data item.

The method of FIG. 4 begins with processor 36 using a set of default prioritization rules, at a default rule definition step 50. Initially, when the context is not yet defined, the default rules may use different heuristics, such as heuristics referring to the relative priorities among different content types. For example, E-mail and instant messaging data items may be assigned higher scores than web pages.

Processor 36 accepts data items for prioritization via network interface 32, at an input step 54. In some embodiments, the data items provided for prioritization are filtered by a certain filter or according to certain criteria. For example, the data items may be associated with a certain user or user terminal, the e-mail messages sent to a certain e-mail address, the transactions performed with a certain web site, the data items destined to or originating from a certain country or territory, and/or any other criterion.

Processor 36 prioritizes the data items in accordance with the prioritization rules, at a prioritization step 58. Each data item is thus assigned a score, which indicates its relevance or value in the present context. Note that the scores enable comparing of different types of data items. In other words, the ordered list of prioritized data items will usually have data items of different types.

System 20 may perform or invoke an action based on the prioritized data items, at an action step 62. The system may carry out different types of actions. Several exemplary actions are described further below. The method loops back to input step 54 above, for accepting subsequent data items from network 24.

After prioritizing the data items at prioritization step 58 above, processor 36 presents the prioritization results to analyst 44 using user interface 40, at a presentation step 66. The processor accepts feedback from the analyst regarding the prioritization, at a feedback step 70. The analyst may provide either positive or negative feedback, e.g., indicate that the score assigned to a certain data item is too high, too low, or correct.

Processor 36 adapts the set of prioritization rules based on the analyst's feedback, at an adaptation step 74. Any known machine learning or training method can be used for this purpose, such as, for example, methods based on neural networks or Hidden Markov Model (HMM) methods. Typically, the machine learning method is based on a parametric mathematical model, which produces the prioritization rules. In such a scheme, adapting the set of prioritization rules comprises tuning the parameters of the model, so that the resulting set of rules perform satisfactorily.

Tuning of the model parameters is often carried out by processing a "training set," i.e., a set of data items for which the desired results are known a-priori. The training set may be divided into two parts, the first part used for tuning the model parameters, and the second part used for testing the performance of the tuned rules. Tuning may be performed in an iterative manner, until satisfactory performance is achieved. In some implementations, the amount of tuning applied depends on a distance, or similarity, between the model results and the expected results. Iterative tuning may be performed by re-calculation or incrementally.

The analyst's feedback may comprise positive feedback (indications of correct prioritization) and/or negative feedback (indications of incorrect prioritization). By adapting the rules based on the analyst's feedback, the set of rules gradually converges to better characterize the desired context.

The method then loops back to input step 54 above, for accepting subsequent data items from the network. Processor 36 prioritizes the subsequent data items using the current set of rules. Alternatively, such as in the absence of new data items, the method may loop back to prioritization step 58 above, in order to re-prioritize the existing data items using the updated set of rules.

The analyst may provide feedback as to the current prioritization quality at any time. As the iterations continue, however, the amount of feedback and the amount of adaptation of the rules usually diminishes. In some cases, analyst feedback may become unnecessary after a sufficient (and preferably small) number of iterations.

As noted above, system 20 may carry out or invoke various actions based on the prioritization of the data items. For example, processor 36 may sort the data items based on the relevance scores, and present some or all of the sorted data items to the analyst in decreasing order of relevance. Processor 36 may filter out data items that are considered irrelevant, e.g., data items whose score is lower than a certain threshold. The system may trigger an alert, such as when a highly relevant data item is detected or when a newly-arriving data item matches a predetermined alerting rule. The alert may use any suitable technique, such as an audio alert, a visual alert, an e-mail message and/or a Short Messaging Service (SMS) notification. The system may also be used for deciding whether to record or discard data items, especially when storage resources are limited. For example, the system may decide to store only data items whose score is higher than a certain threshold.

Another possible type of action is profiling of other data items using the current set of rules. Assuming the set of rules has converged to the point in which it accurately characterizes the desired context, the set of rules can be used to determine the extent to which any other data item, or group of data items, matches the context. The profiled data items may be accepted from network 24 or from any other source, either in real-time or off-line. The profiling operation may produce a binary result, i.e., an indication of whether or not the profiled set of data items matches the context. Alternatively, the profiling operation may produce a soft quantitative measure, which indicates the level of correlation (match) between the profiled set and the context.

For example, when the context comprises a specific target person, the set of rules may uniquely identify network traffic patterns and content that is generated by this person. Applying the rule set to a collection of data items accepted from an external system may assist in collecting new network identifiers of the target person, track the person in spite of identity changes and otherwise assist in tracking the person.

The sequence of steps shown in FIG. 4 is an exemplary flow, which is chosen purely for the sake of conceptual clarity. In alternative embodiments, system 20 may carry out any other suitable sequence of steps for prioritizing data items. For example, the system may decide to act upon the prioritized data items only after a certain number of iterations, so that the set of rules is likely to adequately represent the desired context.

The description of FIG. 4 refers to a real-time process, in which newly-arriving data items are prioritized as they are accepted from network 24. Additionally or alternatively, the method can be applied to a certain collection of data items in a batch process. In such a process, system 20 repeatedly re-prioritizes the collection of data items while adapting the set of rules, without accepting new data items during the process. System 20 may also perform hybrid processes that combine off-line and real-time prioritization, such as periodic or occasional update cycles. Combining off-line and real-time prioritization may also be advantageous when the process of tuning the prioritization rules is computationally-intensive. In such cases, a cost-effective trade-off may be to apply coarse rule adaptation in real-time, and finer rule adaptation off-line.

As noted above, the system can also perform off-line context-aware prioritization of a collection of data items that were obtained from another network or from any other source.

The description above refers to a single analysis session, in which an analyst uses system 20 to prioritize data items in a particular context. In alternative embodiments, system 20 may support multiple sessions having different contexts, which may operate on the same or different data items. Some sessions may be time-limited, while others may have a continuous, on-going nature. In addition, the method of FIG. 4 regarding obtaining feedback from the analyst and adapting the rules responsively to the feedback may be applied to the prioritization of data item types as discussed with regard to FIG. 2, and/or may be applied to the prioritization of logical transaction as discussed with regard to FIG. 3. Further, system 20 may generate a prioritization of both individual data items and logical transactions together, allowing a comparison of the data items along with logical transactions based on the relevance scores.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A computer-implemented method for performing a data analysis task having an associated analysis context, the method comprising:
defining the analysis context associated with the data analysis task, wherein data items have a variable relevance in accordance with the context, and wherein the data items are grouped together to form logical transactions conducted by a user over a predetermined time period;
receiving the logical transactions exchanged over a communication network, wherein the logical transactions include a first data item type and a second data item type that is different from the first data item type;
processing the logical transactions with a set of prioritization rules to generate relevance scores that quantify a relevance of the logical transactions to the analysis context, wherein the relevance scores are assigned according to a common scale; and
generating a prioritization of the logical transactions based on the relevance scores.

2. The computer-implemented method of claim 1 wherein processing the data items with the set of prioritization rules to generate the relevance scores that quantify the relevance of the data items to the analysis context comprises normalizing the data items by assigning a first relevance score to data items of the first data item type and a second relevance score to data items of the second data item type, wherein the first relevance score and the second relevance score comprise different values.

3. The computer-implemented method of claim 1 wherein the first data item type comprises a web page data item type and the second data item type comprises an electronic mail (e-mail) data item type.

4. The computer-implemented method of claim 1 wherein the plurality of data items comprises a web page, an e-mail message, a file transfer session, an instant messaging chat session, and a textual transcript of a telephone call.

5. The computer-implemented method of claim 1 further comprising displaying the prioritization of the data items on a user interface.

6. A data analysis system for performing a data analysis task having an associated analysis context, the system comprising:
a processor configured to define the analysis context associated with the data analysis task, wherein data items have a variable relevance in accordance with the context, and wherein data items are grouped together to form logical transactions conducted by a user over a predetermined time period;
a network interface configured to receive the logical transactions exchanged over a communication network, wherein the logical transactions include a first data item type and a second data item type that is different from the first data item type;
the processor configured to process the logical transactions with a set of prioritization rules to generate relevance scores that quantify a relevance of the logical transactions to the analysis context, wherein the relevance scores are assigned according to a common scale, and generate a prioritization of the logical transactions based on the relevance scores.

7. The system of claim 6 wherein the processor, to process the data items with the set of prioritization rules to generate the relevance scores that quantify the relevance of the data items to the analysis context, normalizes the data items by assigning a first relevance score to data items of the first data item type and a second relevance score to data items of the second data item type, wherein the first relevance score and the second relevance score comprise different values.

8. The system of claim 6 wherein the first data item type comprises a web page data item type and the second data item type comprises an e-mail data item type.

9. The system of claim 6 wherein the plurality of data items comprises a web page, an e-mail message, a file transfer session, an instant messaging chat session, and a textual transcript of a telephone call.

10. The system of claim 6 further comprising the processor configured to display the prioritization of the data items on a user interface.

11. A computer-implemented method for performing a data analysis task having an associated analysis context, the method comprising:
- defining the analysis context associated with the data analysis task, wherein data items have a variable relevance in accordance with the context, and wherein data items are grouped together to form logical transactions conducted by a user over a predetermined time period;
- receiving the logical transactions exchanged over a communication network;
- defining a plurality of logical transactions based on one or more transaction criteria, wherein each logical transaction of the plurality of logical transactions comprise at least two data items of the plurality of data items;
- processing the logical transactions with a set of prioritization rules to generate relevance scores that quantify a relevance of the logical transactions to the analysis context, wherein the relevance scores are assigned according to a common scale; and
- generating a prioritization of the logical transactions based on the relevance scores.

12. The computer-implemented method of claim 11 wherein defining the plurality of logical transactions based on the one or more transaction criteria comprises identifying a first idle period based on an idle period threshold during which no packets are sent to or transferred from a packet address, identifying an active period occurring immediately after the first idle period and during the active period a plurality of packets are sent to or transferred from the packet address, and identifying a second idle period based on the idle period threshold occurring immediately after the active period and during the second idle period no packets are sent to or transferred from the packet address, wherein a plurality of data items associated with the plurality of packets comprises a logical transaction.

13. The computer-implemented method of claim 11 wherein the one or more transaction criteria comprises a username, a time period, a packet address, an e-mail address, and a plurality of web pages linked together through a plurality of hyperlinks.

14. The computer-implemented method of claim 11 wherein the plurality of data items comprises a web page, an e-mail message, a file transfer session, an instant messaging chat session, and a textual transcript of a telephone call.

15. The computer-implemented method of claim 11 further comprising displaying the prioritization of the logical transactions on a user interface.

16. A data analysis system for performing a data analysis task having an associated analysis context, the system comprising:
- a processor configured to define the analysis context associated with the data analysis task, wherein data items have a variable relevance in accordance with the context, and wherein data items are grouped together to form logical transactions conducted by a user over a predetermined time period;
- a network interface configured to receive the logical transactions exchanged over a communication network;
- the processor configured to define a plurality of logical transactions based on one or more transaction criteria, wherein each logical transaction of the plurality of logical transactions comprise at least two data items of the plurality of data items, process the logical transactions with a set of prioritization rules to generate relevance scores that quantify a relevance of the logical transactions to the analysis context, wherein the relevance scores are assigned according to a common scale, and generate a prioritization of the logical transactions based on the relevance scores.

17. The system of claim 16 wherein the processor, to define the plurality of logical transactions based on the one or more transaction criteria, identifies a first idle period based on an idle period threshold during which no packets are sent to or transferred from a packet address, identifies an active period occurring immediately after the first idle period and during the active period a plurality of packets are sent to or transferred from the packet address, and identifies a second idle period based on the idle period threshold occurring immediately after the active period and during the second idle period no packets are sent to or transferred from the packet address, wherein a plurality of data items associated with the plurality of packets comprises a logical transaction.

18. The system of claim 16 wherein the one or more transaction criteria comprises a username, a time period, a packet address, an e-mail address, and a plurality of web pages linked together through a plurality of hyperlinks.

19. The system of claim 16 wherein the plurality of data items comprises a web page, an e-mail message, a file transfer session, an instant messaging chat session, and a textual transcript of a telephone call.

20. The system of claim 16 further comprising the processor configured to display the prioritization of the logical transactions on a user interface.

\* \* \* \* \*